US012671277B2

(12) United States Patent
Fedida et al.

(10) Patent No.: US 12,671,277 B2
(45) Date of Patent: Jun. 30, 2026

(54) ELECTRICAL MACHINE

(71) Applicant: GM GLOBAL TECHNOLOGY OPERATIONS LLC, Detroit, MI (US)

(72) Inventors: Vincent Fedida, Shanghai (CN); Chengwu Duan, Shanghai (CN); Jian Yao, Shanghai (CN); Denghao Fan, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 18/490,377

(22) Filed: Oct. 19, 2023

(65) Prior Publication Data

US 2025/0088047 A1     Mar. 13, 2025

(30) Foreign Application Priority Data

Sep. 8, 2023     (CN) .......................... 202311162024.2

(51) Int. Cl.
H02K 1/14          (2006.01)
H02K 21/24         (2006.01)

(52) U.S. Cl.
CPC ............. H02K 1/146 (2013.01); H02K 21/24 (2013.01)

(58) Field of Classification Search
CPC ........... H02K 1/02; H02K 1/14; H02K 1/146; H02K 1/16; H02K 1/165; H02K 1/20;

H02K 1/27; H02K 1/279; H02K 1/2795; H02K 1/2798; H02K 16/02; H02K 21/12; H02K 21/14; H02K 21/22; H02K 21/24
See application file for complete search history.

(56) References Cited

U.S. PATENT DOCUMENTS

| | | | | |
|---|---|---|---|---|
| 2006/0028093 | A1* | 2/2006 | Minagawa | ............. H02K 1/148 310/156.32 |
| 2007/0018520 | A1 | 1/2007 | Kaneko | |
| 2011/0309694 | A1 | 12/2011 | Woolmer | |
| 2014/0001891 | A1* | 1/2014 | Nitta | ...................... H02K 1/148 310/44 |
| 2021/0288569 | A1* | 9/2021 | Yao | ........................ H02K 21/24 |

FOREIGN PATENT DOCUMENTS

DE        102020133676 A1 *  6/2022

* cited by examiner

*Primary Examiner* — Bumsuk Won
(74) *Attorney, Agent, or Firm* — Quinn IP Law

(57) ABSTRACT

A stator for an electrical machine defines a central axis and has a first stator face facing parallel to the central axis and a second stator face facing parallel to the central axis, with the first stator face and the second stator face facing in opposite directions. The stator includes a plurality of ferromagnetic segments disposed about the central axis, each segment having a pair of parallel faces that face parallel to the central axis of the stator. On each stator face, faces of adjacent segments of the plurality of segments form gaps therebetween, the gaps extending radially relative to the central axis, the gaps on the first stator face being angularly offset relative to the central axis from the gaps on the second stator face.

20 Claims, 6 Drawing Sheets

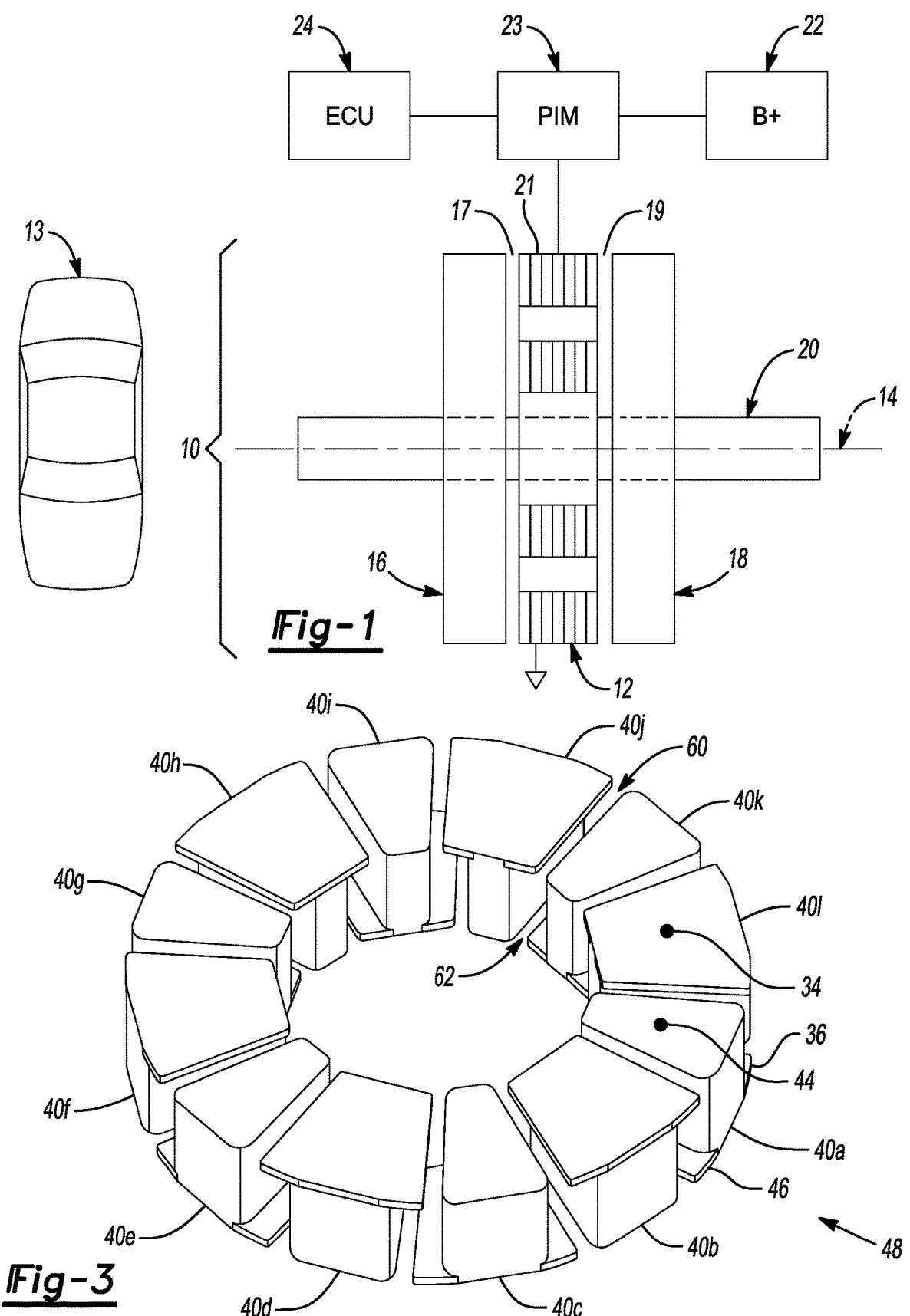
_Fig-1_
_Fig-3_

49

44

40a

46

21a (a)

(b)

(a)

(b)

ELECTRICAL MACHINE

CROSS REFERENCE TO RELATED APPLICATIONS

This disclosure claims priority to China Patent Application 202311162024.2 filed on Sep. 8, 2023, which is hereby incorporated by reference.

INTRODUCTION

The present disclosure is in the field of electrical machines.

Several configurations of electrical machines may be suitable for various applications. One configuration of electrical machine is an axial-flux permanent magnet machine. Such a machine may offer high power density and relatively small thickness, providing packaging advantages in some applications.

Axial-flux permanent magnet machines may, however, be capable of performance improvements.

SUMMARY

A stator for an electrical machine defines a central axis and has a first stator face facing parallel to the central axis and a second stator face facing parallel to the central axis, with the first stator face and the second stator face facing in opposite directions. The stator includes a plurality of ferromagnetic segments disposed about the central axis, each segment having a pair of parallel faces that face parallel to the central axis of the stator. On each stator face, faces of adjacent segments of the plurality of segments form gaps therebetween, the gaps extending radially relative to the central axis, the gaps on the first stator face being angularly offset relative to the central axis from the gaps on the second stator face. The stator also includes electrically conductive windings disposed about the segments and located in slots therebetween, the windings defining axes parallel to the central axis of the stator.

As a variation, each segment of the stator, when viewed radially inwardly toward the central axis of the stator, may form a "T" shape. As an additional variation, each segment of the stator may be identical or substantially identical in geometry.

For each segment of the stator, one face of the pair of faces may be larger than the other face of the pair of faces. Additionally, a first segment of the plurality of segments may have second and third segments of the plurality of segments adjacent thereto, with the larger face of the first segment facing in an opposite direction from the larger faces of the second and third segments.

In further variations, one face of each segment of the stator may at least partially overhang at least one slot. Further, the segments of the stator may each consist of two pieces fastened together. Yet further, the segments of the stator may comprise laminations.

An electrical machine includes a stator that defines a central axis and has a first stator face facing parallel to the central axis and a second stator face facing parallel to the central axis, with the first stator face and the second stator face facing in opposite directions. The stator includes a plurality of ferromagnetic segments disposed about the central axis, each segment having a pair of parallel faces that face parallel to the central axis of the stator. On each stator face, faces of adjacent segments of the plurality of segments form gaps therebetween, the gaps extending radially relative to the central axis, the gaps on the first stator face being angularly offset relative to the central axis from the gaps on the second stator face. The stator also includes electrically conductive windings disposed about the segments and located in slots therebetween, the windings defining axes parallel to the central axis of the stator. The electrical machine additionally includes a first rotor disposed coaxially with the central axis for rotation relative to the stator and axially spaced from the stator by a first air gap and a second rotor disposed coaxially with the central axis for rotation relative to the stator and axially spaced from the stator by a second air gap. A motor vehicle may comprise the electrical machine.

An alternative stator for an electrical machine defines a central axis. The stator includes a plurality of segments disposed about the central axis of the stator, each segment having a pair of parallel faces that face parallel to the central axis of the stator and in opposite directions. For each segment, one face of the pair of faces has a different shape than the other face of the pair of faces. The stator also includes electrically conductive windings disposed about the segments and disposed in slots therebetween, the windings defining axes parallel to the central axis of the stator.

In variations of the alternative stator, each segment, when viewed radially inwardly toward the central axis of the stator, may form a "T" shape. Additionally, the segments of the stator may be identical or substantially identical in geometry. Yet further, one face of each segment may at least partially overhang at least one slot, or exactly one face of each segment may at least partially overhang at least one slot. As an enhancement, the segments may comprise metal laminations.

As an additional enhancement of the alternative stator, one face of the pair of faces of each segment may be larger in surface area than the other face of the pair of faces. Further, a first segment of the plurality of segments may have second and third segments of the plurality of segments adjacent thereto, and the larger face of the first segment may in an opposite direction from the larger faces of the second and third segments.

The above summary does not represent every embodiment or every aspect of this disclosure. Other possible features and advantages will be readily apparent from the following detailed description of the embodiments for carrying out the disclosure when taken in connection with the accompanying drawings and appended claims. Further, combinations and subcombinations of elements described in this disclosure are expressly included in this disclosure.

BRIEF DESCRIPTION OF THE DRAWINGS

FIG. 1 is a schematic drawing showing an axial-flux permanent magnet machine along with its associated electrical and electronic componentry.

FIG. 3 shows segments included in the stator of the permanent magnet machine.

DETAILED DESCRIPTION

Figure 2:
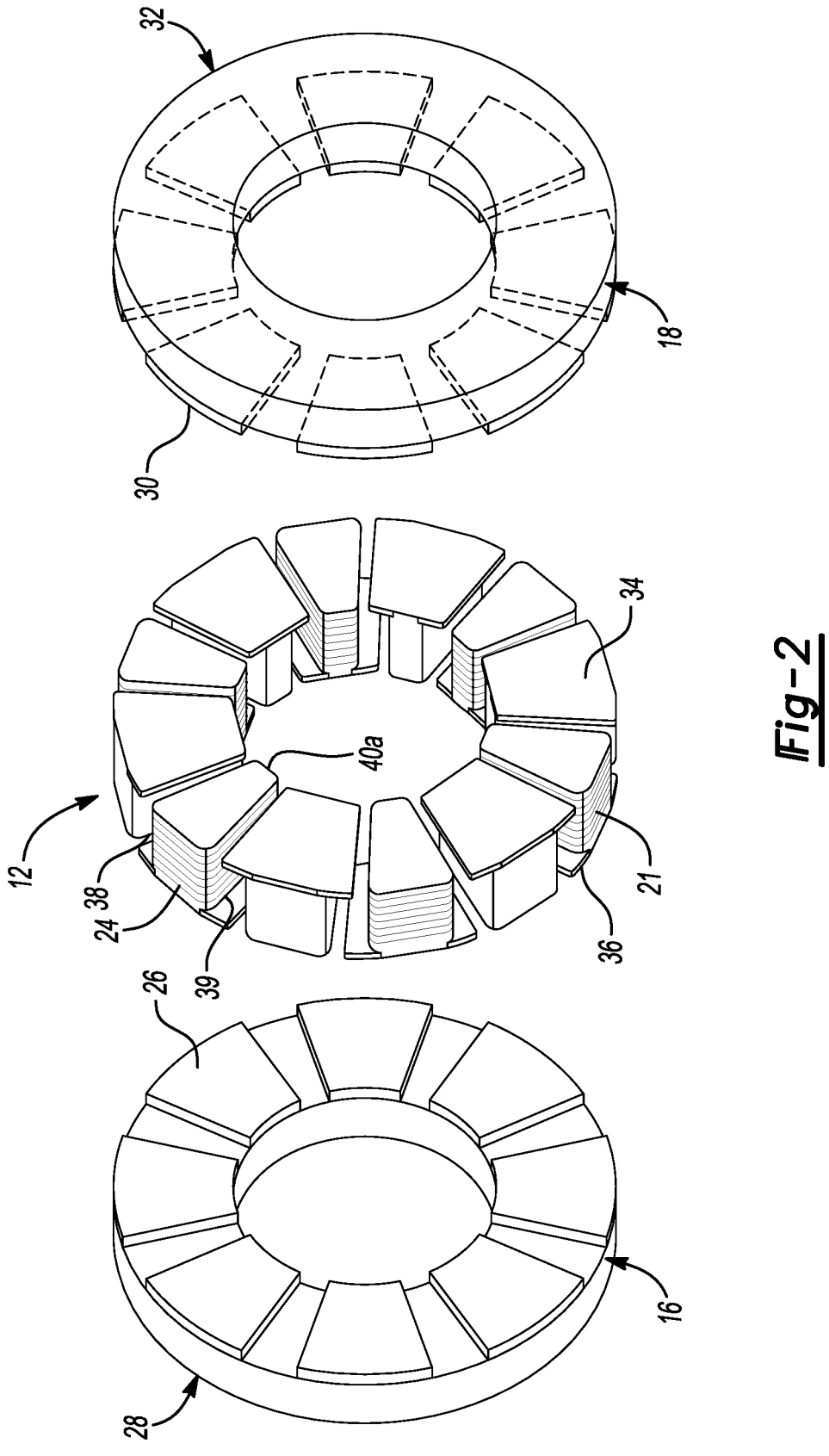
FIG. 2 is an exploded view of the magnetic portions of the stator and rotors of the permanent magnet machine of FIG. 1.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring first to FIG. 1, an electrical machine 10 is illustrated. Electrical machine 10 may be an axial-flux permanent magnet machine, such as a motor. Electrical machine 10 may have a non-rotating stator 12 affixed to a housing (not shown). Stator 12 defines a central axis 14 that acts as a rotational axis for two permanent magnet rotors, rotor 16 and rotor 18. Rotor 16 and rotor 18 may be fixed to a common shaft 20 for rotation therewith, with shaft 20 being supported by bearings in the housing of electrical machine 10 and suitably journaled for rotation within stator 12. Rotor 16 is separated from stator 12 by an air gap 17, and rotor 18 is separated from stator 12 by an air gap 19. Electric machine 10 may be of the so-called yokeless variety; that is, stator 12 may not comprise a back iron through which magnetic flux flows in stator 12.

Stator 12 is wound with electrical windings 21 that provide magnetic flux for interaction with the permanent magnets of rotor 16 and rotor 18 to generate mechanical rotational force from electrical machine 10, in the event that electrical machine 10 is acting as a motor. The windings may be energized by a power inverter module (PIM) 23, which converts stored electrical energy from a traction battery (B+) 22 into alternating current (AC) electrical energy. An electronic control unit (ECU) 24, which may be integrated with power inverter module 23 or which may be a separate controller, controls the operation of power inverter module 23. ECU 24 is an electronic controller that has sufficient electronic resources (microcontroller, memory, software, inputs, outputs and the like) to control electrical machine 10. Electrical machine 10 may alternatively be operated as an electrical generator if rotor 16 and rotor 18 are rotated through the input of mechanical energy.

Electrical machine 10 as configured in FIG. 1 may be characterized as an "axial-flux" motor, because magnetic flux generated by windings 21 travels axially, that is, parallel to central axis 14 of electrical machine 10. This may be contrasted from a so-called "radial flux" electrical machine, where the stator may be disposed about the rotor and flux travels radially relative to the center axis of the electrical machine. Electrical machine 10 may be used to power a motor vehicle 13, such as an electric vehicle or a hybrid-electric vehicle.

Refer additionally to FIG. 2. Rotor 16 may have a plurality of permanent magnets 26 disposed on the face of rotor 16 that faces stator 12. Permanent magnets 26 may be affixed to a back iron 28 of rotor 16 by a suitable mechanical method, such as adhesive. Rotor 18 may have a plurality of permanent magnets 30 disposed on the face of rotor 18 that faces stator 12. Permanent magnets 30 may be affixed to a back iron 32 of rotor 18 by a suitable mechanical method, such as adhesive. Given that rotor 16 and rotor 18 may comprise permanent magnet poles, electrical machine 10 may be characterized as a "permanent magnet" machine. Stator 12 may have a first stator face 34 and a second stator face 36. Stator face 34 and Stator face 36 may be parallel or substantially parallel to one another. Further, stator face 34 and stator face 36 may each face parallel to central axis 14 and in opposite directions from one another, say to the right and left in FIG. 1.

Windings 21 (only a portion of which are illustrated in FIG. 2) may be wound around segments of stator 12, such as segment 40*a*. Adjacent segments of stator 12 may form slots, such as slots 38 and 39, in which windings of stator 12 are disposed.

Referring additionally to FIG. 3, stator 12 may be comprised of multiple segments 40*a*, 40*b*, 40*c*, 40*d*, 40*c*, 40*f*, 40*g*, 40*h*, 40*i*, 40*j*, 40*k* and 401, though the present disclosure is not limited to a stator having 12 segments. Segment 40*a* may have a first face 44 and a second face 46. Face 44 and face 46 may be mutually or substantially mutually parallel and, as segment 40*a* is incorporated as part of stator 12, may each face parallel to central axis 14 of stator 12, though face 44 and face 46 may face in opposite directions. Face 44 and face 46 may be of different shapes, and face 46 may have a greater surface area than face 44. When viewed toward the central axis of stator 12 (that is, for instance, from direction 48), segment 40*a* may have a "T" shape. Stator segments 40*a*-401 are suitably attached relative to one another, say by a compression ring that circumscribes stator segments 40*a*-401, or by adhesive between stator segments 40*a*-401 and the housing of electric machine 10.

When stator segments 40*a*-401 are incorporated as parts of stator 12, the faces of stator segments 40*a*-401 form gaps therebetween, such as gap 60 in stator face 34 and gap 62 in stator face 36. Gap 60 and gap 62 may be disposed radially or generally radially with respect to central axis 14. It may be noted that gap 60 and gap 62 may be angularly offset from one another, in terms of angular position about central axis 14.

Figure 4:
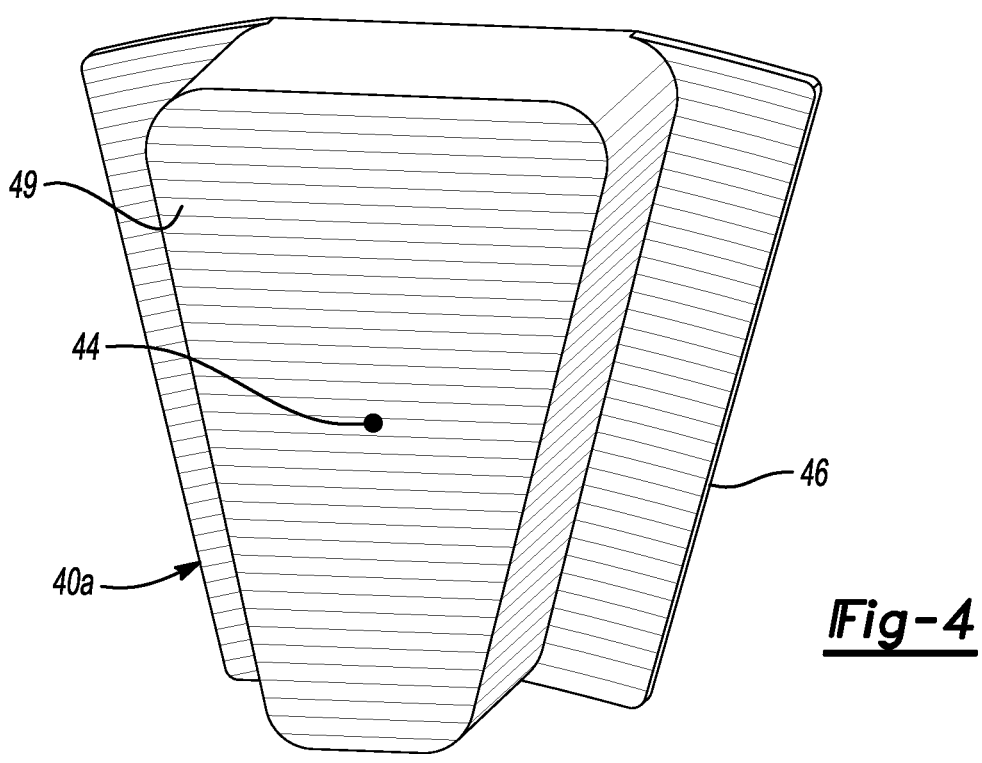
FIG. 4 is an enlarged illustration of one segment of the stator of the permanent magnet machine.

Referring additionally to FIG. 4, stator segment 40*a* is illustrated in additional detail. Stator segment 40*a* may be comprised of ferromagnetic material. Stator segment 40*a* may further be comprised of laminations 49 of ferromagnetic material such as iron or steel. Alternatively, stator segment 40*a* may be comprised of other ferromagnetic materials or ferromagnetic material in other forms, such as soft magnetic compound (SMC), a molded composite of ferromagnetic material in a polymer or other electrically conductive carrier. Stator segment 40*b* through stator segment 401 may feature similar or identical construction and materials to stator segment 40*a*.

Face 44 and face 46 of stator segment 40a may be flat or substantially flat and, further, faces 44 and 46 may be mutually parallel to one another and face outward from stator 12 as stator segment 40a is incorporated in stator 12. Face 44 and face 46 may face in opposite directions and may face parallel or generally parallel to central axis 14 of stator 12. It may be noted that face 44 of stator segment 40a may be different in shape or size than face 46 of stator segment 40a. Face 46 may be larger in surface area than face 44.

Other stator segments 40b-401 may be of the same geometry, materials, and construction as stator segment 40a. ("Geometry" refers here to size and shape of stator segments 40a-401.) That is, other stator segments 40b-401 may be identical to stator segment 40a. As shown in FIG. 3, however, stator segments 40a-401 may be installed in stator 12 in an alternating fashion, with the larger face of one stator segment facing in an opposite direction from the larger faces of the two stator segments adjacent to it.

Figure 5:
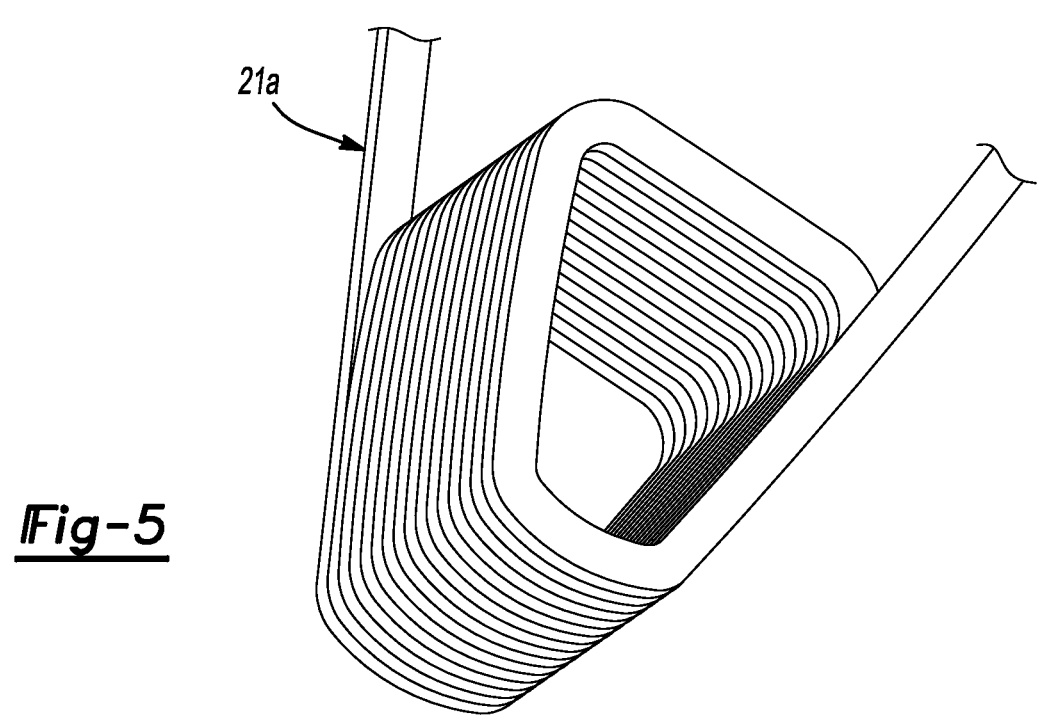
FIG. 5 shows one segment of the electrical winding of the stator of the permanent magnet machine.

Referring additionally to FIG. 5, windings 21 may be comprised of segments such as segment 21a, which have a shape that allows segment 21a to be slid over the smaller end of segment 40a. Segment 21a may be comprised of copper, aluminum, an alloy of the foregoing, or another suitable conductive material to effectively act as an electrical machine winding. Segment 21a may be stamped and then formed into the shape shown in FIG. 5 for convenient installation over the smaller face 44 of stator segment 40a. Segments 21a, once similarly installed on each of stator segments 40a-401, may be suitably electrically connected, such as in a WYE or DELTA configuration, to form windings 21 of stator 12.

Segment 40a may be comprised of ferromagnetic material, such as a steel that is appropriate for incorporation within the core of an electrical machine. Segment 40a may be formed of laminations. Segments 40b-401 may be similarly constructed to segment 40a.

Electrical machine 10 may be an 8-pole, 12-slot motor and may be operated with windings 21 configured in three phases, though those parameters are exemplary only and not limiting.

Electrical machine 10 has been demonstrated to provide certain advantageous performance characteristics. For instance, with reference to FIG. 6, graph (a) shows the cogging torque for a representative axial-flux, permanent magnet electrical machine. By contrast, graph (b) shows considerably less cogging torque for an axial-flux, permanent magnet electrical machine according to this disclosure.

Figure 7:
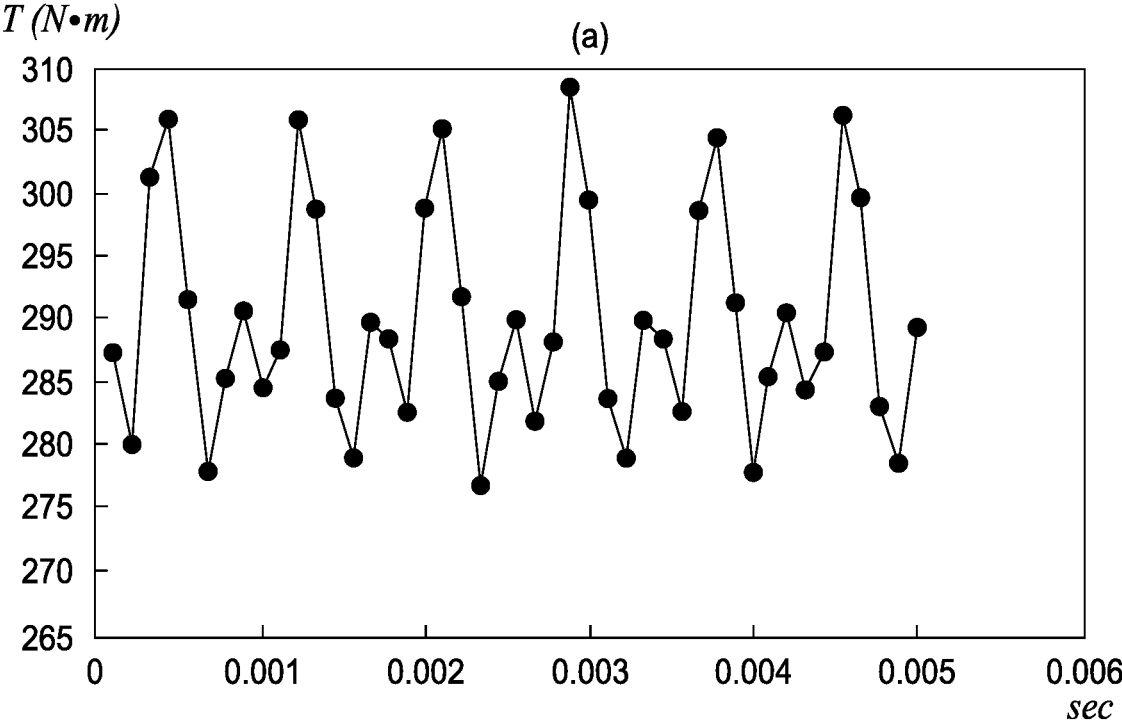
FIG. 7 shows torque ripple of a representative axial-flux permanent magnet machine and the torque ripple of the exemplary permanent magnet machine of FIGS. 1-5 of the present disclosure.
Figure 7:
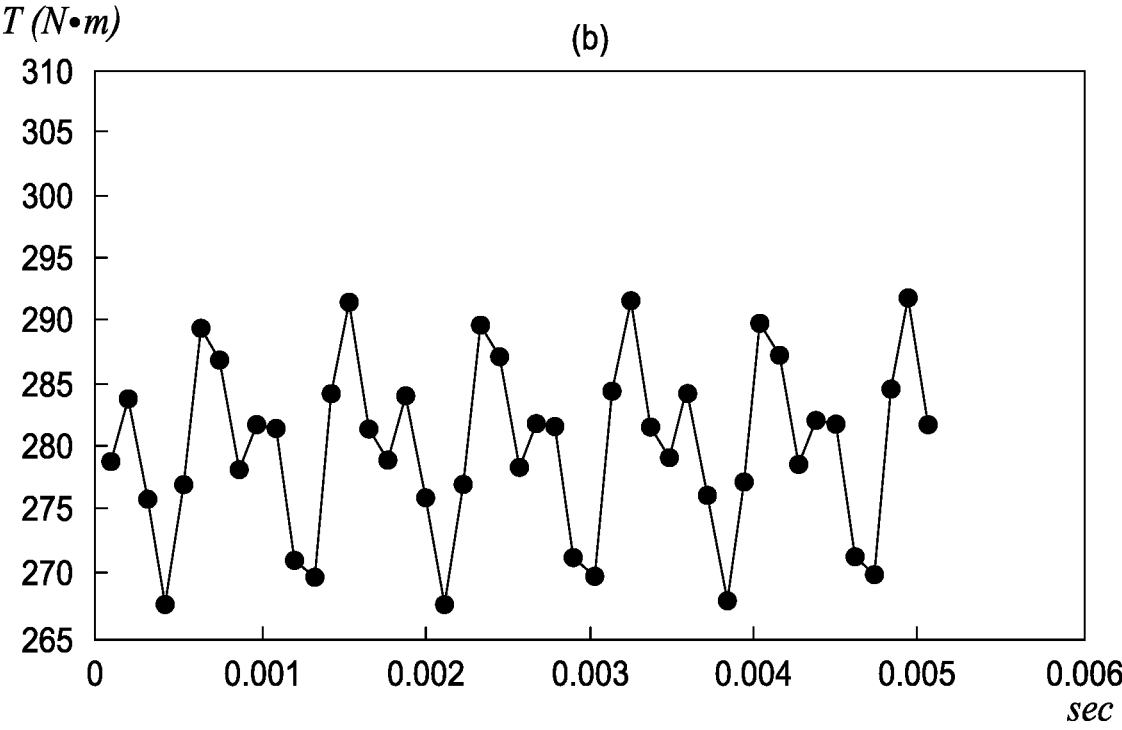

Further, then, with reference to FIG. 7, graph (a) shows torque ripple for a representative axial-flux, permanent magnet electrical machine. On the other hand, graph (b) shows substantially reduced torque ripple for an axial-flux, permanent magnet electrical machine according to this disclosure.

Figure 6:
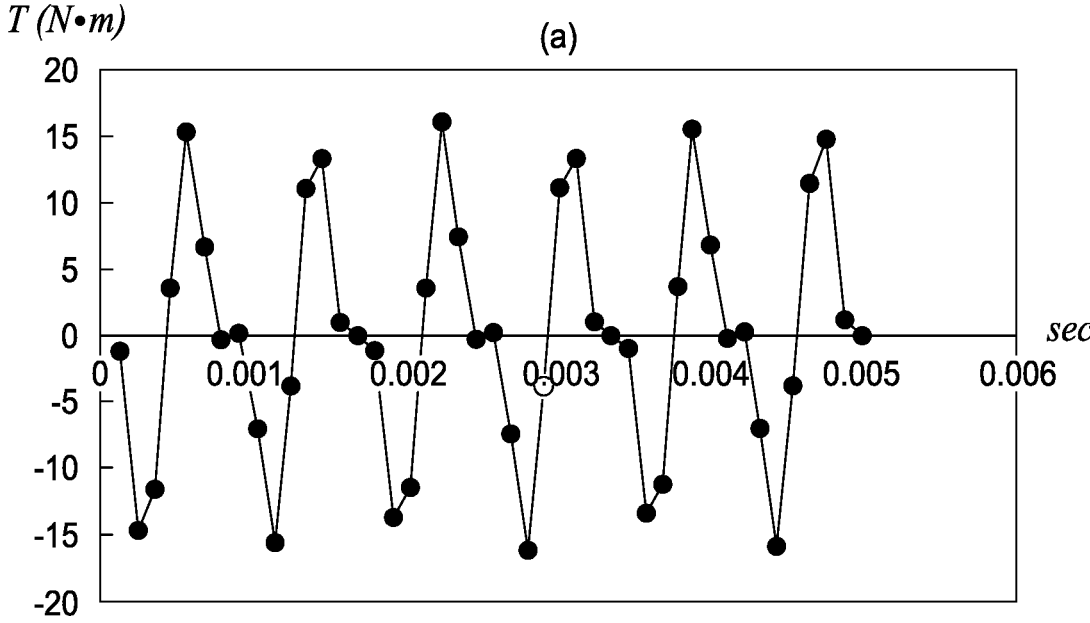
FIG. 6 shows the cogging torque of a representative axial-flux permanent magnet machine and the cogging torque of the exemplary permanent magnet machine of FIGS. 1-5 of the present disclosure.
Figure 6:
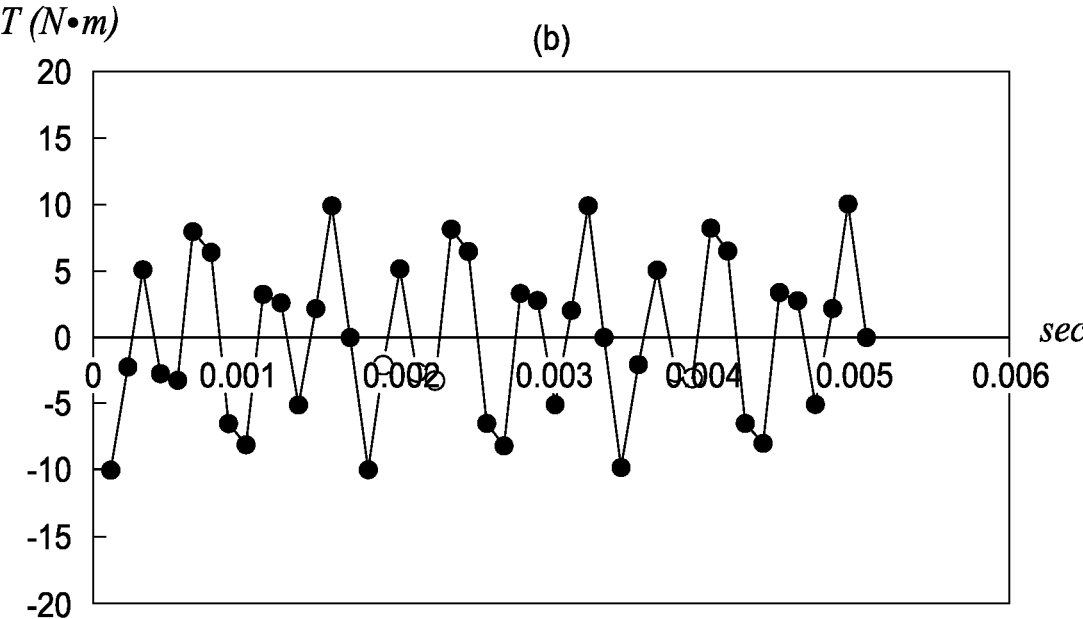

The improved performance characteristics of electrical machine 10 illustrated in FIG. 6 and FIG. 7 may be due to the differences in geometry of faces 44 and 46 of stator segment 40a (and corresponding differences in geometry between respective faces of stator segment 40b through stator segment 401). The improved performance characteristics may also be due to the gaps (such as gap 62) in stator face 36 being angularly offset, relative to central rotation axis 14, from the gaps (such as gap 60) in stator face 34. In each case, the magnetic flux generated by stator 12 is more dispersed than may be the case in alternative electrical machines, smoothing the output torque of electrical machine 10. Cogging torque reduction may be accomplished for electrical machine 10 because of the relative offset of the gaps in stator face 34 and stator face 36 of stator 12. Torque ripple reduction may be accomplished by the modulation and phase shifting of the excitation of stator 12 between the two air gaps, air gap 17 and air gap 19.

Figures 8, 9:
FIG. 8 shows an alternative design for an alternative stator segment of the stator of a permanent magnet machine.
FIG. 9 shows alternative stator segments of FIG. 8 as disposed about the central axis of the permanent magnet machine.

Referring now to FIG. 8, an alternative configuration of a segment of a stator 12' is illustrated. Here, a segment 140a may be comprised of a first part 142 and a second part 144. First part 142 and second part 144 may be joined at a joining line 146 to form segment 140a. First part 142 and second part 144 may be made of ferromagnetic material, such as laminated iron or steel or molded ferromagnetic compound such as SMC. First part 142 and second part 144 may be assembled with a winding segment, such as winding segment 21a (FIG. 5), disposed between first part 142 and second part 144. First part 142 and second part 144 may be affixed together using adhesive or another suitable joining method. Segment 140a may have a first face 147 and a second face 149.

Referring additionally to FIG. 9, stator 12' may comprise segment 140a and additional segments (segment 140b through segment 1401), that may be of like construction, materials, and geometry to segment 140a and disposed about the central axis of stator 12'. The faces of adjacent stator segments may have radially extending gaps therebetween (such as gap 150 and gap 152 in opposite faces of stator 12'). Gaps such as gap 150 and gap 152 may be offset from one another in terms of their angular position relative to the central axis of stator 12'.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. For instance, while the example disclosure provided herein shows the teachings hereof in the environment of a motor vehicle, these teachings are not so limited. Moreover, this disclosure expressly includes combinations and sub-combinations of the elements and features presented above and below.

What is claimed is:

1. A stator for an electrical machine, the stator defining a central axis and having a first stator face facing parallel to the central axis and a second stator face facing parallel to the central axis, the first stator face and the second stator face facing in opposite directions, the stator comprising:

a plurality of ferromagnetic segments disposed about the central axis and separated from one another, each ferromagnetic segment having a first segment face facing parallel to the central axis and a second segment face facing parallel to the central axis, the first segment face and the second segment face of each respective ferromagnetic segment facing in opposite directions, wherein on the first stator face, the first segment faces of adjacent segments of the plurality of ferromagnetic segments form gaps therebetween and on the second stator face, the second segment faces of adjacent ferromagnetic segments of the plurality of ferromagnetic segments form gaps therebetween;

each of the foregoing gaps extending radially relative to the central axis, the gaps on the first stator face being circumferentially angularly offset relative to the central axis from the gaps on the second stator face; and electrically conductive windings disposed about the segments and located in slots therebetween, the windings defining axes parallel to the central axis of the stator.

2. A stator as recited in claim 1, wherein each ferromagnetic segment, when viewed radially inwardly toward the central axis of the stator, forms a "T" shape.

3. A stator as recited in claim 1, wherein each ferromagnetic segment is identical or substantially identical in geometry.

4. A stator as recited in claim 1, wherein for each ferromagnetic segment, one face of the pair of faces is larger than the other face of the pair of faces.

5. A stator as recited in claim 4, wherein:
   a first ferromagnetic segment of the plurality of ferromagnetic segments has second and third ferromagnetic segments of the plurality of ferromagnetic segments adjacent thereto; and
   the larger face of the first ferromagnetic segment faces in an opposite direction from the larger faces of the second and third ferromagnetic segments.

6. A stator as recited in claim 1, wherein one face of each ferromagnetic segment at least partially overhangs at least one slot.

7. A stator as recited in claim 1, wherein the ferromagnetic segments each consist of two parts affixed together.

8. A stator as recited in claim 1, wherein the ferromagnetic segments comprise laminations.

9. An electrical machine comprising:
   a stator, the stator defining a central axis and having a first stator face facing parallel to the central axis and a second stator face facing parallel to the central axis, the first stator face and the second stator face facing in opposite directions, the stator comprising:
      a plurality of ferromagnetic segments disposed about the central axis and separated from one another, each ferromagnetic segment having a first segment face facing parallel to the central axis and a second segment face facing parallel to the central axis, the first segment face and the second segment face of each respective ferromagnetic segment facing in opposite directions, wherein on, the first stator face, the first segment faces of adjacent segments of the plurality of ferromagnetic segments form gaps therebetween and on the second stator face, the second segment faces of adjacent ferromagnetic segments of the plurality of ferromagnetic segments form gaps therebetween;
      each of the foregoing gaps extending radially relative to the central axis, the gaps on the first stator face being circumferentially angularly offset relative to the central axis from the gaps on the second stator face; and
      electrically conductive windings disposed about the segments and located in slots therebetween, the windings defining axes parallel to the central axis of the stator;
   a first rotor disposed coaxially with the central axis for rotation relative to the stator and axially spaced from the stator by a first air gap; and
   a second rotor disposed coaxially with the central axis for rotation relative to the stator and axially spaced from the stator by a second air gap.

10. The electrical machine of claim 9, wherein:
   the first rotor comprises a first plurality of permanent magnets disposed opposite the windings of the stator; and
   the second rotor comprises a second plurality of permanent magnets disposed opposite the windings of the stator.

11. The electrical machine of claim 10, wherein the first rotor and the second rotor are coupled to a common shaft for rotation therewith.

12. A motor vehicle comprising the electrical machine of claim 9.

13. A motor vehicle comprising:
   an electrical machine further including:
      a stator for the electrical machine, the stator defining a central axis and having a first stator face facing parallel to the central axis and a second stator face facing parallel to the central axis, the first stator face and the second stator face facing in opposite directions, the stator comprising:
         a plurality of ferromagnetic segments disposed about the central axis and separated from one another, each ferromagnetic segment having a first segment face facing parallel to the central axis and a second segment face facing parallel to the central axis, the first segment face and the second segment face of each respective ferromagnetic segment facing in opposite directions, wherein on the first stator face, the first segment faces of adjacent segments of the plurality of ferromagnetic segments form gaps therebetween and on the second stator face, the second segment faces of adjacent ferromagnetic segments of the plurality of ferromagnetic segments form gaps therebetween;
         each of the foregoing gaps extending radially relative to the central axis, the gaps on the first stator face being circumferentially angularly offset relative to the central axis from the gaps on the second stator face; and
         electrically conductive windings disposed about the segments and located in slots therebetween, the electrically conductive windings defining axes parallel to the central axis of the stator;
      a first rotor disposed coaxially with the central axis for rotation relative to the stator and axially spaced from the stator by a first air gap; and
      a second rotor disposed coaxially with the central axis for rotation relative to the stator and axially spaced from the stator by a second air gap;
      a power inverter module coupled to the electrically conductive windings to energize the electrically conductive windings.

14. A motor vehicle as recited in claim 13, wherein each ferromagnetic segment, when viewed radially inwardly toward the central axis of the stator, forms a "T" shape.

15. A motor vehicle as recited in claim 13, wherein each ferromagnetic segment is identical or substantially identical in geometry.

16. A motor vehicle as recited in claim 13, wherein for each ferromagnetic segment, one of the first segment face and the second segment face is larger in surface area than the other of the first segment face and the second segment face.

17. A motor vehicle as recited in claim 16, wherein:
   a first ferromagnetic segment of the plurality of ferromagnetic segments has second and third ferromagnetic segments of the plurality of ferromagnetic segments adjacent thereto; and
   the larger segment face of the first ferromagnetic segment faces in an opposite direction from the larger segment faces of the second and third ferromagnetic segments.

18. A motor vehicle as recited in claim 13, wherein one face of each ferromagnetic segment at least partially overhangs at least one slot.

19. A motor vehicle as recited in claim 13, wherein exactly one face of each ferromagnetic segment at least partially overhangs at least one slot.

20. A motor vehicle as recited in claim 13, wherein the ferromagnetic segments comprise metal laminations.

* * * * *